United States Patent Office 3,823,205
Patented July 9, 1974

3,823,205
LACQUERS BASED ON ACRYLIC POLYMER BLENDS
Werner S. Zimmt, Wynnewood, Pa., assignor to E. I. du Pont de Nemours and Company, Wilmington, Del.
No Drawing. Continuation-in-part of application Ser. No. 588,699, July 23, 1969, which is a continuation-in-part of application Ser. No. 509,147, Nov. 22, 1965, which in turn is a continuation of application Ser. No. 860,800, Sept. 24, 1969, all now abandoned. This application July 12, 1972, Ser. No. 270,969
Int. Cl. C08f 29/50
U.S. Cl. 260—901          18 Claims

ABSTRACT OF THE DISCLOSURE

The lacquer which comprises a blend of two acrylic polymers in a liquid carrier, the difference between the glass transition temperatures of the polymers being at least 30° C.

CROSS REFERENCE TO RELATED APPLICATIONS

This application is a continuation-in-part of application Ser. No. 588,699, filed July 23, 1969, which in turn is a continuation-in-part of application Ser. No. 509,147, filed Nov. 22, 1965, both now abandoned, and a continuation of Ser. No. 860,800, filed Sept. 24, 1969, now abandoned.

SUMMARY OF THE INVENTION

This invention relates to coating compositions. It is more particularly directed to lacquers whose principal film-forming ingredients are two-component blends of acrylic polymers. The differences in glass transition temperature between the blends' components is at least 30° C.

One component of these blends (Component A), making up at least 5% of the blends' total weights, can be poly(methyl methacrylate), poly(ethyl methacrylate), poly(propyl methacrylate), poly(isopropyl methacrylate) or a copolymer of methyl methacrylate with at least one of an alkyl acrylate whose alkyl group contains 1 through 20 carbon atoms, an alkyl methacrylate whose alkyl group contains 2 through 18 carbon atoms, or styrene. Mixtures of these can be also used.

The other component of the blends (Component B), also making up at least 5% of the blends' total weights, is a two-monomeric component copolymer of methyl methacrylate with at least one of an alkyl acrylate whose alkyl group contains 1 through 10 carbon atoms or an alkyl methacrylate whose alkyl group contains 4 through 18 carbon atoms. Mixtures of these can also be used.

The difference between the glass transition temperatures ($T_g$) of componnets (A) and (B) must be at least 30° C. Glass transition temperature is measured on a Differential Thermal Mechanical Analyzer, Model 900, sold by E. I. du Pont de Nemours and Company.

The compositions of the invention give finishes having excellent air-dry gloss and higher water-spot-free temperatures [1] and lower craze-free temperatures [2] than those

[1] "Water-spot-free temperature" is the highest temperature to which a finish can be heated, after placing a drop of tap water on the finish and evaporating it, without leaving a permanent spot.
[2] "Craze-free temperature" is the lowest temperature at which a drop of methylethyl ketone can be evaporated from the finish without producing craze marks.

formed from compositions whose film-forming components are conventional polymer systems. Surprisingly, the compositions give these benefits while containnig 33% to 50% less plasticizer than usual.

These advantages make the compositions of the invention useful as automotive lacquers, where the high craze resistance and the high print resistance, (i.e., freedom from deformation under load at 150° F.) of their finishes are especially desirable.

Preferred for the excellence of the finishes they give are compositions in which components (A) and (B), as entities, have $T_g$ values of at least 0° C.

Also preferred for the excellence of the finishes they give are compositions in which component (B) has a glass transition temperature of at least 50° C.

Especially preferred for their excellence are compositions in which component (A) is poly(methyl methacrylate) and component (B) is at least one of (1) a methyl methacrylate/methyl acrylate copolymer whose monomer unit weight ratio is 70/30 to 40/60 respectively,
(2) a methyl methacrylate/ethyl acrylate copolymer whose monomer unit weight ratio is 80/20 to 40/60 respectively,
(3) a methyl methacrylate/butyl acrylate copolymer whose monomer unit weight ratio is 85/15 to 65/35 respectively,
(4) a methyl methacrylate/2-ethylhexyl acrylate copolymer whose monomer unit weight ratio is 90/10 to 70/30 respectively,
(5) a methyl methacrylate/octyl methacrylate copolymer whose monomer unit weight ratio is 85/15 to 65/35 respectively, or
(6) a methyl methacrylate/lauryl methacrylate copolymer whose monomer unit weight ratio is 90/10 to 75/25 respectively.

Also preferred for their unique properties are compositions in which component (A) is a copolymer of methyl methacrylate and butyl methacrylate
octyl methacrylate
lauryl methacrylate
methyl acrylate ethyl acrylate
butyl acrylate
or
2-ethylhexyl acrylate and component (B) is a copolymer of methyl methacrylate with these same comonomers. In these compositions, the weight percent of the comonomer in component (B) must exceed the weight percent of the comonomer in component (A) according to the following table:

| When Comonomer is: | Excess is at least (wt. percent units) |
|---|---|
| Butyl methacrylate | 36 |
| Octyl methacrylate | 20 |
| Lauryl methacrylate | 10 |
| Methyl acrylate | 30 |
| Ethyl acrylate | 20 |
| Butyl acrylate | 15 |
| 2-Ethylhexyl acrylate | 10 |

Most preferred as an automotive lacquer because of the durability of the finish it gives is a composition comprising (A) at least about 30%, by weight of the acrylic polymer film-forming components, of poly(methyl methacrylate) having a relative viscosity (0.5% solution in ethylene chloride) of 1.10–1.25;
(B) at least about 30%, by weight of the acrylic polymer film-forming components, of a methyl methacrylate/butyl acrylate 82/18 or a 76.5/23.5 copolymer having a relative viscosity of 1.10/1.25, and (C) up to 20%, by weight of the solids of the composition, of a plasticizer.

In some cases, the preferred compositions may also contain from 5% through 20%, by weight of the solids of composition, of cellulose acetate butyrate.

Although only coating compositions based on blends of particular acrylic polymers or copolymers have been described, it should be understood that the benefits of a finish having high print resistance, a low craze-free temperature and superior air-dry gloss, and the advantages of being able to prepare a commercially sprayable lacquer having high solids content can be had with any composition containing a two-component blend of acrylic polymers or copolymers, so long as the polymers or copolymers of the components are of "border-line compatibility".

"Border-line compatibility" describes polymers or copolymers, which, as entities, have $T_g$ values which differ significantly from each other but which, when blended as entities and cast as a film from solution, give an optically clear film.

Another way of defining this is to say that compositions containing polymers of "border-line" compatibility are homogeneous in solution at ambient temperature, but on evaporation of the liquid phase at temperatures above 65° C. separate into two distinct phases on a submicroscopic scale (i.e., the phases can be seen only with an electron microscope). Needless to say, all blends of polymers, copolymers or mixtures coming within these definitions are a part of the invention.

The preparation of components (A) and (B) is simple and straightforward. A skilled polymer chemist will be able to prepare them without difficulty, using well-known standard solution polymerization techniques and conventional catalysts.

The approximate glass transition temperature of any particular polymer or copolymer to be used in a composition of the invention can be calculated from the following tables:

GLASS TEMPERATURE FACTORS*

| Percent | Methyl acrylate | Ethyl acrylate | Butyl acrylate | 2-ethylhexyl acrylate | Methyl methacrylate | Butyl methacrylate | Lauryl methacrylate | Styrene |
|---|---|---|---|---|---|---|---|---|
| 5 | 0.18 | 0.20 | 0.23 | 0.27 | 0.13 | 0.17 | 0.24 | 0.13 |
| 10 | 0.36 | 0.40 | 0.46 | 0.53 | 1.26 | 0.34 | 0.48 | 0.27 |
| 15 | 0.54 | 0.60 | 0.69 | 0.80 | 0.40 | 0.51 | 0.72 | 0.40 |
| 20 | 0.71 | 0.80 | 0.91 | 1.06 | 0.53 | 0.68 | 0.96 | 0.54 |
| 25 | 0.89 | 1.01 | 1.34 | 1.33 | 0.66 | 0.85 | 1.20 | 0.67 |
| 30 | 1.07 | 1.19 | 1.37 | 1.60 | 0.79 | 1.02 | 1.44 | 0.80 |
| 35 | 1.25 | 1.39 | 1.60 | 1.86 | 0.93 | 1.19 | 1.68 | 0.94 |
| 40 | 1.42 | 1.59 | 1.83 | 2.13 | 1.06 | 1.36 | 1.92 | 1.07 |
| 45 | 1.60 | 1.79 | 2.06 | 2.39 | 1.19 | 1.53 | 2.16 | 1.20 |
| 50 | 1.78 | 1.99 | 2.29 | 2.66 | 1.32 | 1.71 | 2.41 | 1.34 |
| 55 | 1.96 | 2.19 | 2.51 | 2.93 | 1.46 | 1.88 | 2.65 | 1.48 |
| 60 | 2.14 | 2.39 | 2.74 | 3.19 | 1.59 | 2.05 | 2.89 | 1.61 |
| 65 | 2.31 | 2.59 | 2.97 | 3.46 | 1.72 | 2.22 | 3.13 | 1.74 |
| 70 | 2.49 | 2.79 | 3.20 | 3.72 | 1.85 | 2.39 | 3.37 | 1.88 |
| 75 | 2.67 | 2.99 | 3.43 | 3.99 | 1.98 | 2.56 | 3.61 | 2.01 |
| 80 | 2.85 | 3.18 | 3.66 | 4.26 | 2.12 | 2.73 | 3.85 | 2.15 |
| 85 | 3.03 | 3.38 | 3.88 | 4.52 | 2.45 | 2.90 | 4.09 | 2.28 |
| 90 | 3.20 | 3.58 | 4.11 | 4.79 | 2.38 | 3.07 | 4.33 | 2.41 |
| 95 | 3.38 | 3.78 | 4.34 | 5.05 | 2.51 | 3.24 | 4.57 | 2.54 |
| 100 | 3.56 | 3.98 | 4.57 | 5.32 | 2.65 | 3.41 | 4.81 | 2.68 |

*Factors for monomers not shown in this table can be obtained from Rohm and Haas Co., Special Products Dept., Philadelphia, Pa. 19105.

Directions:
1. Find the percentage of desired monomer and get the corresponding glass temperature factor.
2. Add the temperature factors and get the actual glass temperature of a copolymer made from these monomers from conversion chart below:

CONVERSION CHART

| Factor | °C. | °F. | Factor | °C. | °F. |
|---|---|---|---|---|---|
| 2.65 | 105 | 221 | 3.46 | 16 | 61 |
| 2.68 | 100 | 212 | 3.48 | 14 | 57 |
| 2.72 | 95 | 203 | 3.51 | 12 | 54 |
| 2.75 | 90 | 194 | 3.53 | 10 | 50 |
| 2.79 | 85 | 185 | 3.56 | 8 | 46 |
| 2.83 | 80 | 176 | 3.58 | 6 | 43 |
| 2.87 | 75 | 167 | 3.61 | 4 | 39 |
| 2.92 | 70 | 158 | 3.64 | 2 | 36 |
| 2.96 | 65 | 149 | 3.66 | 0 | 32 |
| 3.00 | 60 | 140 | 3.73 | −5 | 23 |
| 3.05 | 55 | 131 | 3.80 | −10 | 14 |
| 3.10 | 50 | 122 | 3.88 | −15 | 5 |
| 3.14 | 45 | 113 | 3.95 | −20 | −4 |
| 3.19 | 40 | 104 | 4.03 | −25 | −13 |
| 3.22 | 38 | 100 | 4.12 | −30 | −22 |
| 3.24 | 36 | 97 | 4.20 | −35 | −31 |
| 3.26 | 34 | 93 | 4.29 | −40 | −40 |
| 3.28 | 32 | 90 | 4.39 | −45 | −49 |
| 3.30 | 30 | 86 | 4.48 | −50 | −58 |
| 3.32 | 28 | 82 | 4.59 | −55 | −67 |
| 3.34 | 26 | 79 | 4.69 | −60 | −76 |
| 3.37 | 24 | 75 | 4.81 | −65 | −85 |
| 3.39 | 22 | 72 | 4.93 | −70 | −94 |
| 3.41 | 20 | 68 | 5.05 | −75 | −103 |
| 3.44 | 18 | 64 | 5.18 | −80 | −112 |
|  |  |  | 5.32 | −85 | −121 |

The coating compositions themselves are made by first selecting components (A) and (B) and their concentrations in the compositions according to the properties wanted of the finish, and then thoroughly mixing solutions or dispersions of these components in organic liquids, together with such other adjuncts as appear desirable.

Illustrative of organic liquids which can be used are toluene, ketones such as acetone or methyl ethyl ketone, alcohols such as ethanol and isopropanol, or mixtures of these. Before use, the compositions are thinned to application viscosity with customary lacquer solvents.

The compositions will ordinarily have solids contents of from about 20% to 40%, by weight of the total composition. Under certain conditions, compositions of the invention may separate into two phases on standing. Should this occur, it can be remedied by lowering solids content of the compositions or by using components of lower molecular weight.

It is generally desirable to add a plasticizer to the compositions. Plasticizers compatible with poly(methyl methacrylate), such as dibutyl phthalate, bis-(methylcyclohexyl) phthalate, butyl benzyl phthalate, tributyl citrate, polyester plasticizers and alkyd resins are satisfactory. Whichever plasticizer is used, it is ordinarily present at a concentration of from about 2% through about 25%, by weight, of the solids of the composition.

Although the compositions can be used as clear lacquers, they are ordinarily pigmented. Conventional pigments can be used, in the usual amounts. The pigments are added to the compositions as mill bases, made in the usual way. With certain pigments, it may be desirable to prepare the mill base in a solution of a terpolymer in an organic liquid such as ketone, toluene, xylene, or mixtures of these. Two of the monomer units of this terpolymer can be any of those listed as monomer units for the copolymers of components (A) and (B). The third monomer unit can be acrylic acid, methacrylic acid, acrylonitrile, glycidyl methacrylate or a nitrogen containing monomer such as 2-dimethylaminoethyl methacrylate. This third monomer unit will constitute up to 5% of the terpolymer's weight.

The coating compositions can be applied to substrates by spraying, dipping or brushing. Although the wet films can be air dried without sacrificing gloss, it is preferred that they be baked at temperatures of from about 220° F. to about 325° F. for about 20 to 30 minutes.

DESCRIPTION OF THE PREFERRED EMBODIMENTS

The following examples are presented so that the invention can be more easily practiced. These examples show only preferred embodiments of the invention. Variations on these themes can, of course, be composed by those skilled in the art by manipulating proportions and polymer compositions from what is shown. These variations are naturally considered to be part of the invention.

In the examples, all parts are by weight and all relative viscosities are determined from 0.5% solution in ethylene chloride.

EXAMPLE 1

A lacquer is prepared by blending together

| | Parts |
|---|---|
| Poly(methyl methacrylate) solution (relative viscosity 1.17, $T_g$ 105° C.) 40% solids in toluene/acetone 70/30 | 125.45 |
| Methyl methacrylate/butyl acrylate 82/18 copolymer solution (relative viscosity 1.17, $T_g$ 61° C.) 40% solids in toluene/acetone 70/30 | 133.9 |
| Alkyd resin solution, coconut oil/ethylene glycol/phthalic anhydride, 0.41/2.93/2.43, acid number 6–8, 70% solution in toluene | 70.47 |
| Cellulose acetate butyrate (20 second viscosity) 15% solution in toluene/acetone 70/30 | 62.7 |
| Cellulose acetate butyrate (2 second viscosity) 25% solution in toluene/acetone 70/30 | 150.36 |
| Pigment dispersion | 131.06 |
| 2-Hydroxy-4-dodecyloxybenzophenone | 4.7 |
| Silicone solution (Dow Corning DC–550) 2% solution in toluene | 1.01 |
| Cellosolve acetate | 46.50 |
| Acetone | 48.87 |
| | 775.02 |

The pigment dispersion is made by blending together the following:

Mill Base 1

| | Parts |
|---|---|
| Prepared by sand-grinding | |
| Monastral green pigment | 9.9 |
| Polymethyl methacrylate | 16.83 |
| in | |
| Toluene/acetone 70/30 | 50.77 |
| | 77.50 |

Mill Base 2

| | |
|---|---|
| Prepared by sand-grinding | |
| Peptized carbon black | 3.48 |
| Polymethyl methacrylate | 11.99 |
| in | |
| Toluene/acetone 70/30 | 33.28 |
| | 48.75 |

Mill Base 3

| | |
|---|---|
| Prepared by blending | |
| Aluminum flake | 0.26 |
| Polymethyl methacrylate | 0.99 |
| in | |
| Toluene/acetone 70/30 | 2.01 |
| | 3.26 |

Mill Base 4

| | |
|---|---|
| Prepared by sand-grinding | |
| Green Gold pigment | 0.22 |
| Polymethyl methacrylate | 0.35 |
| in | |
| Toluene/acetone 70/30 | 0.98 |
| | 1.55 |

The lacquer is reduced with an equal volume of industrial lacquer thinner, sprayed on a conventionally primed auto body panel and then baked for 30 minutes at 300° F. to give a film about 2.3 mils thick.

The water-spot-free temperature of the resulting finish is 151° F. and the craze-free temperature is about 58° F., in contrast to corresponding temperatures of 120° F. and 68° F. obtained with a finish of a similar lacquer containing only poly(methyl methacrylate) as the film-forming ingredient.

EXAMPLE 2

A lacquer is preparing by blending together

| | Parts |
|---|---|
| Poly(methyl methacrylate) solution (relative viscosity 1.17, $T_g$ 105° C.) (40% solids in toluene/acetone 70/30) | 76 |
| Methyl methacrylate/butyl acrylate 76.5/23.5 copolymer solution (relative viscosity 1.13, $T_g$ 58° C.) 40% solids as toluene/methylethyl ketone/isopropanol 70/17/13 | 185 |
| Mill base* | 202 |
| Alkyd resin solution, coconut oil/ethylene glycol/phthalic anhydride, 0.41/2.93/2.43, body A–B, acid number 6–8, 70% solution in toluene | 71 |
| Cellulose acetate butyrate solution, 25% in toluene/acetone 70/30 | 198 |
| Cellosolve acetate | 29 |
| Acetone | 29 |
| | 790 |

*Prepared by sand-grinding

| | |
|---|---|
| Monastral blue pigment | 12.6 |
| Indanthrone blue pigment | 4.0 |
| Carbon black | 2.1 |
| Aluminum flake | 0.7 |
| Poly(methyl methacrylate) solution as above | 130.3 |
| Toluene | 36.2 |
| Xylene | 16.1 |
| | 202.0 |

This lacquer is thinned with lacquer thinner, sprayed on a metal panel and then baked for 30 minutes at 300° F. to give a film about 2.5 mils thick.

The water-spot-free temperature of the resulting finish (as measured on a temperature gradient bar) is 153° F. and the craze-free temperature is less than 50° F.

EXAMPLE 3

A lacquer is prepared by blending together

| | Parts |
|---|---|
| Poly(methyl methacrylate) solution (relative viscosity 1.17, $T_g$ 105° C.) 40% solids in toluene/acetone 70/30 | 91.2 |
| Methyl methacrylate/ethyl acrylate 60/40 copolymer solution (relative viscosity 1.18, $T_g$ 42° C.) 40% solids in toluene/acetone/methylethyl ketone 70/17/13 | 80.0 |
| Butyl benzyl phthalate | 7.2 |
| Mill base* | 66.4 |
| | 244.8 |

*Made by sand-grinding

| | |
|---|---|
| $TiO_2$ | 40.0 |
| Methyl methacrylate/ethyl acrylate/methacrylic acid terpolymer 60/38/2 | 4.0 |
| Methylethyl ketone/acetone/toluene/xylene 2/2/9/87 | 22.4 |
| | 66.4 |

This lacquer is thinned to a viscosity of 30–35 seconds (No. 1 Zahn Cup) with an acetone/cellosolve acetate/toluene 22.5/34/43.5 mixture. The composition is sprayed on a metal panel and baked for 30 minutes at 275° F. to give a finish 2.5 mils thick.

This finish has a water-spot-free temperature of 159° F. in contrast to 139° F. obtained with a finish of a similar lacquer containing only poly(methyl methacrylate) as a film-forming ingredient. It also has a craze-free temperature of less than 56° F., as contrasted with a craze-free temperature of more than 70° F. obtained with a finish of the same poly(methyl methacrylate) lacquer.

EXAMPLE 4

An automotive lacquer is prepared by blending together

| | Parts |
|---|---|
| Methyl methacrylate/butyl acrylate 95/5 copolymer (relative viscosity 1.20, $T_g$ 100° C.) 40% solution in acetone/toluene 40/60 | 142 |
| Methyl methacrylate/butyl acrylate 76.5/23.5 copolymer (relative viscosity 1.13, $T_g$ 58° C.) 40% solution in methylethyl ketone/toluene/isopropanol 17/70/13 | 247 |
| Coconut oil alkyd resin solution of Example 1 | 71 |
| Mill base of Example 1 | 202 |
| Acetone | 66 |
| Cellosolve acetate | 66 |
| | 794 |

This lacquer was diluted to a viscosity of 30–34 seconds (No. 1 Zahn Cup) with lacquer thinner, sprayed on a panel primed with a conventional automobile undercoat and then baked at 300° F. for 30 minutes to give a finish 2.5 mils thick.

This finish had a water-spot-free temperature of 149° F. and a craze-free temperature of 50° F. as contrasted with corresponding temperatures of 134° F. and 70° F. obtained with a finish of a similar lacquer containing only poly(methyl methacrylate) as a film-forming ingredient.

EXAMPLE 5

A lacquer is prepared by blending together

| | Parts |
|---|---|
| Poly(methyl methacrylate) solution (relative viscosity 1.17, $T_g$ 105° C.) 40% solids in toluene/acetone 70/30 | 40 |
| Methyl methacrylate/2-ethylhexyl acrylate 80/20 copolymer solution (relative viscosity 1.20, $T_g$ 42° C.) 40% solids in toluene/acetone 70/30 | 40 |
| | 80 |

To this blend are added 20 parts of a 40% solution of bis(benzyl)triethylene glycol phthalate in toluene. The composition is thoroughly mixed, thinned to spray viscosity with lacquer thinner, sprayed on a metal panel and then baked for 30 minutes at 200° F.

The resulting finish has a print-free temperature of 122° F. and a craze-free temperature of 59° F., as contrasted with corresponding temperatures of 103° F. and 67° F. obtained with a finish of a similar lacquer containing only poly(methyl methacrylate) as a film-forming ingredient.

I claim:

1. A lacquer solution comprising
   I. As a film-forming component
      (A) at least one of
         (1) poly(methyl methacrylate),
         (2) poly(ethyl methacrylate),
         (3) poly(propyl methacrylate),
         (4) poly(isopropyl methacrylate),
         (5) a copolymer composed only of methyl methacrylate and at least one of an alkyl acrylate whose alkyl group contains 1 through 20 carbon atoms, an alkyl methacrylate whose alkyl group contains 2 through 18 carbon atoms, or styrene,
         (6) mixtures of these, and
      (B) at least one of
         (1) a copolymer composed only of methyl methacrylate and an alkyl acrylate whose alkyl group contains 1 through 10 carbon atoms or an alkyl methacrylate whose alkyl group contains 4 through 18 carbon atoms, or
         (2) mixtures of said copolymers; and
   II. an inert organic solvent for (A) and (B); each of (A) and (B) being present in concentrations of at least 5% of their total weight; the difference between the glass transition temperatures of (A) and (B) being at least 30° C., (A) and (B), when blended as entities and cast from solution, giving an optically clear film.

2. A composition according to claim 1 wherein (A) and (B) have glass transition temperatures of at least 0° C.

3. A composition according to claim 1 wherein the glass transition temperature of (A) is at least 50° C.

4. A composition according to claim 3 wherein (A) is a copolymer of methyl methacrylate and a comonomer X (as listed below), and (B) is a copolymer of methyl methacrylate and the same comonomer X (as listed below), the weight percent of comonomer X in (B) exceeding the weight percent of comonomer X in (A) according to the following table:

| When X is | Excess is at least (wt. percent units) |
|---|---|
| Butyl methacrylate | 36 |
| Octyl methacrylate | 20 |
| Lauryl methacrylate | 10 |
| Methyl acrylate | 30 |
| Ethyl acrylate | 20 |
| Butyl acrylate | 15 |
| 2-ethylhexyl acrylate | 10 |

5. A liquid coating composition according to claim 3 wherein (A) is poly(methyl methacrylate) and (B) is at least one of
   (1) a methyl methacrylate/methyl acrylate copolymer whose monomer unit weight ratio is 70/30 to 40/60 respectively,
   (2) a methyl methacrylate/ethyl acrylate copolymer whose monomer unit weight ratio is 80/20 to 40/60 respectively,
   (3) a methyl methacrylate/butyl acrylate copolymer whose monomer unit weight ratio is 85–15 to 65/35 respectively,
   (4) a methyl methacrylate/2-ethylhexyl acrylate copolymer whose monomer unit weight ratio is 90/10 to 70/30 respectively,
   (5) a methyl methacrylate/octyl methacrylate copolymer whose monomer unit weight ratio is 85/15 to 65/35 respectively, or (6) a methyl methacrylate/lauryl methacrylate copolymer whose monomer unit weight ratio is 90/10 to 75/25 respectively.

6. A coating composition according to claim 3 also containing a plasticizer.

7. A coating composition according to claim 5 wherein (B) is a methyl methacrylate/butyl acrylate copolymer whose monomer unit weight ratio is 85/15 to 65/35 respectively.

8. A coating composition according to claim 5 wherein (B) is a methyl methacrylate/butyl acrylate copolymer whose monomer unit weight ratio is 76.5/23.5 respectively, the components having relative viscosities of from 1.10 through 1.25.

9. A coating composition according to claim 5 wherein (B) is a methyl methacrylate/butyl acrylate copolymer whose monomer unit weight ratio is 82/18 respectively, the components having relative viscosities of from 1.10 through 1.25.

10. An article bearing a film derived from the composition of claim 1.

11. An article bearing a film derived from the composition of claim 2.

12. An article bearing a film derived from the composition of claim 3.

13. An article bearing a film derived from the composition of claim 4.

14. An article bearing a film derived from the composition of claim 5.

15. An article bearing a film derived from the composition of claim 6.

16. An article bearing a film derived from the composition of claim 7.

17. An article bearing a film derived from the composition of claim 8.

18. An article bearing a film derived from the composition of claim 9.

References Cited
UNITED STATES PATENTS

| | | | |
|---|---|---|---|
| 3,249,463 | 5/1966 | Carlée | 117—76 |
| 2,947,716 | 8/1960 | Cornell et al. | 260—41 |
| 2,940,950 | 6/1960 | Gushman | 260—32.8 |

MURRAY TILLMAN, Primary Examiner

C. J. SECCURO, Assistant Examiner

U.S. Cl. X.R.

117—132, C, 161 UZ, 161 UC; 260—16, 17 R, 31.8 M, 32.8 R, 33.4 R, 33.6 UA, 41 R, 41 C, 41 B